United States Patent
Kim et al.

(10) Patent No.: US 9,891,359 B2
(45) Date of Patent: Feb. 13, 2018

(54) OPTICAL FILM, MANUFACTURING METHOD THEREOF, AND DISPLAY DEVICE INCLUDING THE SAME

(71) Applicants: SAMSUNG ELECTRONICS CO., LTD., Suwon-si, Gyeonggi-do (KR); CHEIL INDUSTRIES INC., Gumi-si, Gyeongsangbuk-do (KR)

(72) Inventors: Hyung Jun Kim, Suwon-si (KR); Kyoung Ah Oh, Seoul (KR); Moon Yeon Lee, Osan-si (KR); Myung Sup Jung, Seongnam-si (KR)

(73) Assignees: SAMSUNG ELECTRONICS CO., LTD., Gyeonggi-Do (KR); CHEIL INDUSTRIES INC., Gyeongsangbuk-Do (KR)

( * ) Notice: Subject to any disclaimer, the term of this patent is extended or adjusted under 35 U.S.C. 154(b) by 0 days.

(21) Appl. No.: 14/262,763

(22) Filed: Apr. 27, 2014

(65) Prior Publication Data
US 2015/0153496 A1 Jun. 4, 2015

(30) Foreign Application Priority Data
Dec. 2, 2013 (KR) .................. 10-2013-0148543

(51) Int. Cl.
*G02F 1/13363* (2006.01)
*G02B 5/30* (2006.01)
(Continued)

(52) U.S. Cl.
CPC .......... *G02B 5/3016* (2013.01); *B32B 37/203* (2013.01); *G02B 5/305* (2013.01);
(Continued)

(58) Field of Classification Search
CPC ..... G02F 2001/133637; G02F 1/13363; G02F 2001/133633; G02F 2413/01; G02B 5/3016; G02B 5/3083
See application file for complete search history.

(56) References Cited

U.S. PATENT DOCUMENTS 5,657,140 A * 8/1997 Xu ................... G02F 1/13363
349/118
7,548,290 B1 6/2009 Kitamura et al.
(Continued)

FOREIGN PATENT DOCUMENTS

JP 02-120804 A 5/1990
JP 2006-527394 A 11/2006
(Continued)

OTHER PUBLICATIONS

Chao-Te Lee, et al., "Designs of broadband and wide-view patterned polarizers for stereoscopic 3D displays", Optics Express, Dec. 20, 2010, vol. 18, No. 26, pp. 27079-27094.
(Continued)

*Primary Examiner* — Jessica M Merlin
(74) *Attorney, Agent, or Firm* — Cantor Colburn LLP (57) ABSTRACT

An optical film including a polarization layer, a first phase delay layer positioned on a side of the polarization layer and including a liquid crystal, and a second phase delay layer positioned on a side of the first phase delay layer, where the first phase delay layer has an optical axis defining an angle of about 17 degrees to about 27 degrees or about −27 degrees to about −17 degrees relative to a transmissive axis of the polarization layer, and the second phase delay layer has an optical axis defining an angle of about 85 degrees to about 95 degrees relative to the transmissive axis of the polarization layer.

13 Claims, 7 Drawing Sheets (51) Int. Cl.
*B32B 37/20* (2006.01)
*B32B 37/24* (2006.01)
*B32B 38/00* (2006.01)

(52) U.S. Cl.
CPC ...... *G02B 5/3083* (2013.01); *B32B 2037/243* (2013.01); *B32B 2038/0028* (2013.01); *B32B 2307/40* (2013.01); *B32B 2307/42* (2013.01); *B32B 2309/16* (2013.01); *B32B 2457/202* (2013.01); *B32B 2551/00* (2013.01)

(56) References Cited

U.S. PATENT DOCUMENTS

| | | | |
|---|---|---|---|
| 7,830,480 B2 | 11/2010 | Yoshimi et al. | |
| 7,852,436 B2 | 12/2010 | Shimizu et al. | |
| 7,906,184 B2 | 3/2011 | Umemoto et al. | |
| 8,593,599 B2 | 11/2013 | Iida et al. | |
| 2005/0024562 A1* | 2/2005 | Hoff | G02F 1/13363 349/117 |
| 2008/0180604 A1* | 7/2008 | Ohsawa | G02F 1/133634 349/96 |
| 2009/0068472 A1 | 3/2009 | Umemoto et al. | |
| 2009/0103016 A1 | 4/2009 | Shutou et al. | |
| 2009/0135343 A1* | 5/2009 | Kitamura | G02B 5/3033 349/96 |
| 2011/0176092 A1* | 7/2011 | Iida | C08G 63/193 349/96 |
| 2013/0301129 A1 | 11/2013 | In et al. | |

FOREIGN PATENT DOCUMENTS

| | | |
|---|---|---|
| JP | 2011065142 | 3/2011 |
| KR | 1020020058272 A | 7/2002 |
| KR | 1020060007504 | 1/2006 |
| KR | 1020070097596 | 10/2007 |
| KR | 1020070104622 A | 10/2007 |
| KR | 1020080035592 | 4/2008 |
| KR | 1020080047400 A | 5/2008 |
| KR | 1020100078257 | 7/2010 |
| KR | 1020100078259 A | 7/2010 |
| KR | 1020120035061 | 4/2012 |
| KR | 1020130126524 A | 11/2013 |

OTHER PUBLICATIONS

Korean Office Action—Korea Application No. 10-2013-0148543 dated Jun. 10, 2016.
Korean Office Action for Korean Patent Application No. 10-2013-0148543 dated Dec. 30, 2016.

* cited by examiner

OPTICAL FILM, MANUFACTURING METHOD THEREOF, AND DISPLAY DEVICE INCLUDING THE SAME

CROSS-REFERENCE TO RELATED APPLICATION

This application claims priority to Korean Patent Application No. 10-2013-0148543 filed on Dec. 2, 2013, and all the benefits accruing therefrom under 35 U.S.C. § 119, the entire contents of which are incorporated herein by reference.

BACKGROUND

1. Field

An optical film, a manufacturing method thereof, and a display device including the same are disclosed.

2. Description of the Related Art

Commonly used flat panel display may be classified into a light emitting display device emitting light by itself and a non-emissive display device requiring a separated light source, and an optical film such as a retardation film is frequently employed for improving an image quality thereof.

In the case of the light emitting display device, for example, an organic light emitting diode ("OLED"), visibility and the contrast ratio may be deteriorated since the exterior light is reflected by a metal such as an electrode. In order to effectively reduce the deterioration, attempts have been made to effectively prevent a problem that exterior light reflected by the OLED display is leaked to an outside by using a polarizer and a retardation film for shifting linearly polarized light into circularly polarized light.

As a solution for solving the exterior light reflection and a sunglass effect, a liquid crystal display ("LCD"), which is a non-emissive display device, shifts the linearly polarized light to the circularly polarized light to improve the image quality according to a kind of transparent, transflective, reflective properties, and so on.

SUMMARY

Since a compensation film is strongly dependent upon a wavelength of the incident light, it may operate well for light having a certain wavelength, but the effect may be deteriorated for other wavelengths of the incident light.

One embodiment provides an optical film in which a wavelength dependency is effectively reduced and the properties are improved.

Another embodiment provides a method of manufacturing the optical film.

A further embodiment provides a display device including the optical film.

According to one embodiment, an optical film includes a polarization layer, a first phase delay layer positioned on one side of the polarization layer and including a liquid crystal, and a second phase delay layer positioned on one side of the first phase delay layer, where the first phase delay layer has an optical axis defining an angle of about 17 degrees to about 27 degrees or about −27 degrees to about −17 degrees relative to a transmissive axis of the polarization layer, and the second phase delay layer has an optical axis defining an angle of about 85 degrees to about 95 degrees relative to a transmissive axis of the polarization layer.

In an embodiment, the liquid crystal may be arranged along the optical axis of the first phase delay layer.

In an embodiment, the liquid crystal may have positive birefringence.

In an embodiment, the first phase delay layer may include a transparent substrate and a liquid crystal layer positioned on one side of the transparent substrate.

In an embodiment, the first phase delay layer may have in-plane retardation of about 240 nanometers (nm) to about 300 nm for incident light of a wavelength of about 550 nm.

In an embodiment, the first phase delay layer may have thickness direction retardation of greater than or equal to about 0, for example, 0 to about 300 nm, for incident light of a wavelength of 550 nm.

In an embodiment, the first phase delay layer has short wavelength dispersion of about 1.00 to about 1.08, the second phase delay layer has short wavelength dispersion of about 1.00 to about 1.20, the first phase delay layer has long wavelength dispersion of about 0.95 to about 1.00, and the second phase delay layer has long wavelength dispersion of about 0.85 to about 1.00.

In an embodiment, the optical axis of the first phase delay layer may define an angle of about 22.5 degrees relative to a transmissive axis of the polarization layer, and the optical axis of the second phase delay layer may define an angle of about 90 degrees relative to a transmissive axis of the polarization layer.

In an embodiment, the second phase delay layer may include a cycloolefin polymer, poly(meth)acrylate, polycarbonate, polystyrene, polyethylene terephthalate, cellulose, or a combination thereof.

In an embodiment, the second phase delay layer may include polymethylmethacrylate ("PMMA").

In an embodiment, the optical film may further include an adhesive layer interposed between the first phase delay layer and the second phase delay layer.

In an embodiment, the optical film may further include a protective layer positioned on the other side of the polarization layer.

In an embodiment, the optical film may further include a light blocking layer elongated along the edge of the optical film.

In an embodiment, the optical film may further include a compensation layer positioned on one side of the second phase delay layer.

According to another embodiment, a method of manufacturing an optical film is provided, including preparing a polarization layer, a first phase delay layer including a liquid crystal, and a stretched second phase delay layer each in a form of a roll, and moving each roll including the polarization layer, the first phase delay layer, and the second phase delay layer, respectively, in one direction to stack the same in a roll-to-roll process.

In an embodiment, the preparing a first phase delay layer including a liquid crystal may include preparing a transparent substrate having a predetermined patterned surface, and coating a solution including a liquid crystal on the surface of the transparent substrate.

In an embodiment, the surface of the transparent substrate may have a pattern defining an angle of about 63 degrees to about 73 degrees or about −73 degrees to −63 degrees relative to the moving direction of the rolls.

In an embodiment, the second phase delay layer may be stretched to define an angle of about −5 degrees to about 5 degrees relative to the moving direction of the rolls.

According to yet another embodiment, a display device including the optical film is provided.

BRIEF DESCRIPTION OF THE DRAWINGS

The above and other embodiments, advantages and features of this disclosure will become more apparent by describing in further detailed embodiments thereof with reference to the accompanying drawings, in which.

DETAILED DESCRIPTION

Embodiments of the present invention will hereinafter be described in detail, and may be easily performed by those who are skilled in the related art. However, this disclosure may be embodied in many different forms, and is not construed as limited to the embodiments set forth herein.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, an optical film according to one embodiment is described referring to FIGS. 1 and 2.

Figure 1:
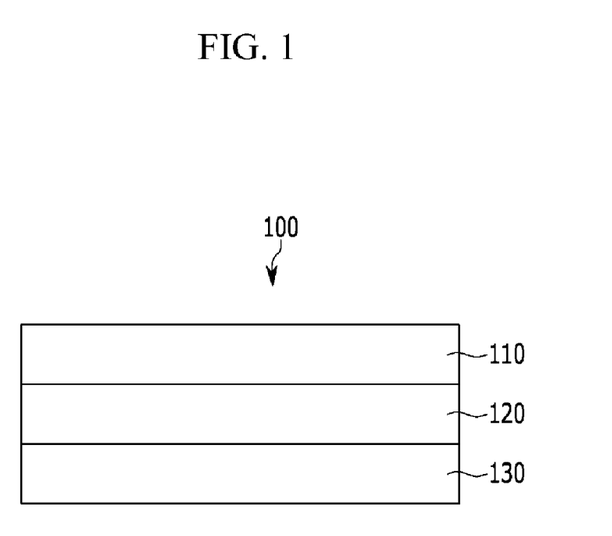
FIG. 1 is a schematic cross-sectional view of an optical film according to an embodiment.
Figure 2:
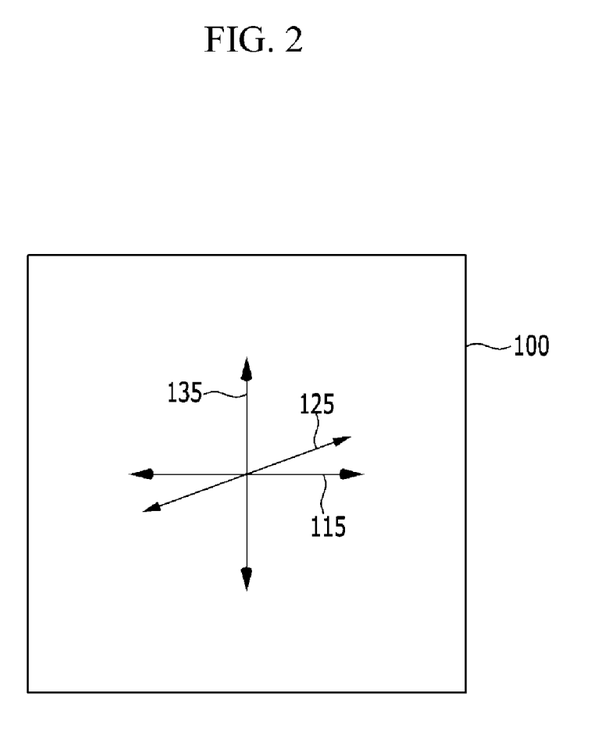
FIG. 2 is a schematic top plan view of the optical film of FIG. 1, FIGS. 3 to 5 are schematic cross-sectional views of optical films according to other embodiments.

FIG. 1 is a schematic cross-sectional view of an optical film according to one embodiment, and FIG. 2 is a schematic top plan view of the optical film of FIG. 1.

As shown in FIG. 1, the optical film 100 according to one embodiment includes a polarization layer 110, a first phase delay layer 120 positioned on one side of the polarization layer 110, and a second phase delay layer 130 positioned on one side of the first phase delay layer 120 facing the side of the polarization layer 110.

In an embodiment, the polarization layer 110 may be a linear polarizer shifting the polarization of incident light into linear polarization. In the embodiment, the polarization layer 110 may include, for example, stretched polyvinyl alcohol ("PVA"), and may be provided by, for example, drawing a polyvinyl alcohol film, adsorbing iodine or a dichroic dye thereto, and borating and washing the same.

In an embodiment, the first phase delay layer 120 may include a liquid crystal.

In the embodiment, the liquid crystal may include, for example, a monomer, an oligomer, or a polymer having a rigid-rod shape elongated along one direction. The liquid crystal may have, for example, positive birefringence. A refractive index ($\Delta n$) is determined by subtracting a refractive index ($n_e$) of light propagating perpendicular to the optical axis from a refractive index ($n_o$) of light propagating parallel to the optical axis.

In an embodiment, the liquid crystal may include a reactive mesogen liquid crystal and may include, for example, at least one reactive cross-linking group. In the embodiment, the reactive mesogen liquid crystal may include at least one of, for example, a rod-shaped aromatic derivative having at least one reactive cross-linking group, propylene glycol 1-methyl, propylene glycol 2-acetate, and a combination represented by P1-A1-(Z1-A2)n-P2 (where P1 and P2 each independently include an acrylate, a methacrylate, a vinyl, a vinyloxy, an epoxy, or a combination thereof. In the embodiment, A1 and A2 each independently include 1,4-phenylene, a naphthalene-2,6-diyl group, or a combination thereof, Z1 includes a single bond, —COO—, —OCO—, or a combination thereof, and n is 0, 1, or 2), but is not limited thereto.

The liquid crystal may be aligned along an optical axis 125 of the first phase delay layer 120, which will be described in detail below.

In an embodiment, the liquid crystal may be coated as a solution on, for example, a transparent substrate. Thereby, the first phase delay layer 120 may include a transparent substrate and a liquid crystal layer positioned on one side of the transparent substrate. In an embodiment, the transparent substrate may include, for example, a triacetyl cellulose ("TAC") film, but is not limited thereto. The surface of the transparent substrate is treated in one direction to provide a predetermined pattern, and for example, may have a valley elongated along one direction. The one direction may be the same as the direction of the optical axis 125 of the first phase delay layer 120 to be described later. The liquid crystal may be arranged in the valley in one direction to provide alignment. The transparent substrate may be removed or omitted.

The second phase delay layer 130 may be a stretched polymer layer including a transparent polymer resin. In an embodiment, the second phase delay layer 130 may include, for example, a cycloolefin polymer, poly(meth)acrylate, polycarbonate, polystyrene, polyethylene terephthalate, cellulose, or a combination thereof. In an embodiment, the second phase delay layer 130 may include, for example, a poly(meth)acrylate such as polymethylmethacrylate (PMMA).

In an embodiment, the second phase delay layer 130 may include a resin having negative birefringence. A refractive index ($\Delta n$) is determined by subtracting a refractive index ($n_o$) of light propagating perpendicular to the optical axis from a refractive index ($n_e$) of light propagating parallel to the optical axis.

Referring to FIGS. 1 and 2, the optical axis 125 of the first phase delay layer 120 may define an angle of about 17 degrees to about 27 degrees or about −27 degrees to about −17 degrees relative to a transmissive axis 115 of the polarization layer 110, and an optical axis 135 of the second phase delay layer 130 may define an angle of about 85 degrees to about 95 degrees relative to the transmissive axis 115 of the polarization layer 110. Within the angle ranges of the optical axis 125 of the first phase delay layer 120 and the optical axis 135 of the second phase delay layer 130, in an embodiment, the optical axis 125 of the first phase delay layer 120 may define an angle of about 22.5 degrees relative to the transmissive axis 115 of the polarization layer 110, and the optical axis of 135 of the second phase delay layer 130 may define an angle of about 90 degrees relative to the transmissive axis 115 of the polarization layer 110.

The optical axis 125 of the first phase delay layer 120 may define an angle ranging from about 63 degrees to about 73 degrees or ranging from about −63 degrees to about −73 degrees relative to the optical axis 135 of the second phase delay layer 130.

Since the transmissive axis 115 of the polarization layer 110 is substantially perpendicular to an absorptive axis (not shown), the optical axis 125 of the first phase delay layer 120 may define an angle ranging from about 63 degrees to about 73 degrees or ranging from about −73 degrees to about −63 degrees relative to the absorptive axis of the polarization layer 110, and the optical axis 135 of the second phase delay layer 130 may define an angle ranging from about −5 degrees to about 5 degrees relative to the absorptive axis of the polarization layer 110.

In an embodiment, the first phase delay layer 120 may have in-plane retardation (Re) of about 240 nm to about 300 nm, for example, about 260 nm to about 280 nm for the incident light of about 550 nm (hereinafter referred to as "reference wavelength"). The in-plane retardation (Re) is represented by Re=($n_x$−$n_y$)×d, where d is a thickness of the layer, and $n_x$ and $n_y$ are refractive indexes for two directions perpendicular to the plane vertical to the thickness direction, respectively. Accordingly, the first phase delay layer 120 may play a role of a half-wave plate.

In an embodiment, the second phase delay layer 130 may have in-plane retardation (Re) of about 110 nm to about 160 nm, for example, about 130 nm to about 140 nm, for the incident light having a reference wavelength. Accordingly, the second phase delay layer 130 may play a role of a quarter-wave plate.

When the optical film is provided by assembling the half-wave plate with the quarter-wave plate, the optical film may have a function of shifting the linearly polarized light into the circularly polarized light if satisfying the relationship of $\theta_1 = 2\theta_0 + 45°$, where $\theta_0$ refers to an angle of the optical axis of a half-wave plate relative to the predetermined reference angle, and $\theta_1$ refers to an angle of the optical axis of a quarter-wave plate relative to the reference angle.

The optical film 100 may have a circularly polarization function since the optical film 100 is provided by stacking the first phase delay layer 120 of the half-wave plate and the second phase delay layer 130 of the quarter-wave plate in the predetermined assembled angle.

The first phase delay layer 120 has thickness direction retardation (Rth) of greater than or equal to 0 for the incident light having a reference wavelength, and the second phase delay layer 130 has thickness direction retardation (Rth) of less than 0. The thickness direction retardation (Rth) is determined by Rth={[($n_x$+$n_y$)/2]−$n_z$}×d, where d is a thickness of the layer, $n_z$ is a refractive index of the thickness direction, and $n_x$ and $n_y$ are refractive indexes for two directions perpendicular to the plane vertical to the thickness direction, respectively.

In an embodiment, the absolute value of the thickness direction retardation (Rth) of the first phase delay layer 120 may be about 300 nm for the incident light having a reference wavelength, and the absolute value of the thickness direction retardation (Rth) of the second phase delay layer 130 may be less than or equal to about 160 nm.

In an embodiment, the thickness direction retardation (Rth) of the first phase delay layer 120 may range from about 0 nm to about 300 nm, or about 100 nm to about 250 nm, or about 130 nm to about 230 nm for the incident light having a reference wavelength, and the thickness direction retardation (Rth) of the second phase delay layer 130 may range from about −160 nm to 0 nm, or about −130 nm to about −50 nm, or about −120 nm to about −90 nm.

In an embodiment, the first phase delay layer 120 may have short wavelength dispersion of about 1.00 to about 1.08, and the second phase delay layer 130 may have short wavelength dispersion of about 1.00 to about 1.20. The short wavelength dispersion is determined by dividing the retardation of the incident light of a wavelength of about 450 nm by the retardation of the incident light of a reference wavelength.

In an embodiment, the first phase delay layer 120 may have long wavelength dispersion of about 0.95 to about 1.00, and the second phase delay layer 130 may have long wavelength dispersion of about 0.85 to about 1.00. The long wavelength dispersion is determined by dividing the retardation of the incident light of a wavelength of about 650 nm by the retardation of the incident light of a reference wavelength.

In an embodiment, the optical film 100 may further include an adhesive layer between the first phase delay layer 120 and the second phase delay layer 130. The adhesive layer binds the first phase delay layer 120 to the second phase delay layer 130, and the adhesive layer may include, for example, a pressure sensitive adhesive in an embodiment.

Figure 3:
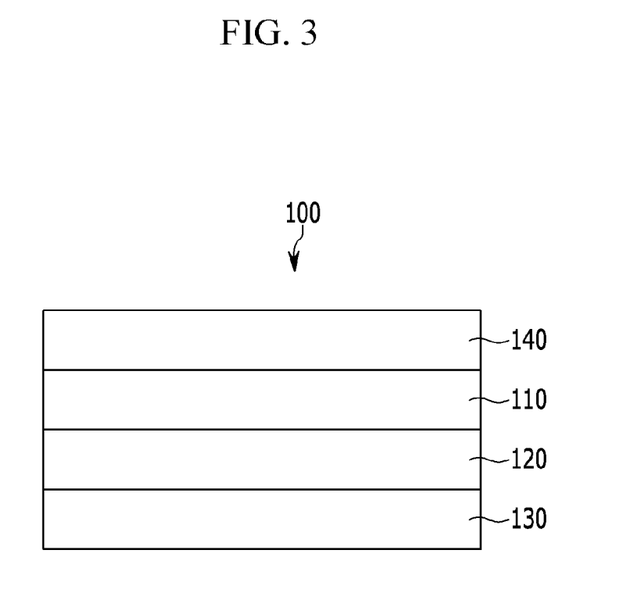
Figure 4:
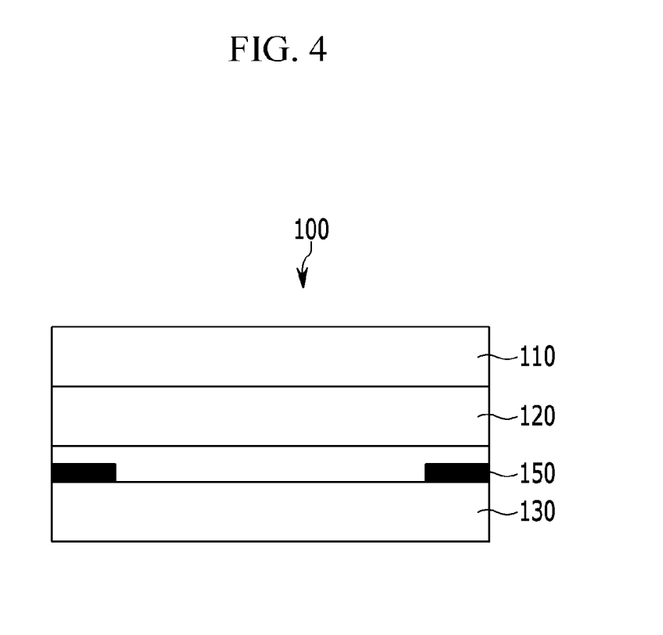
Figure 5:
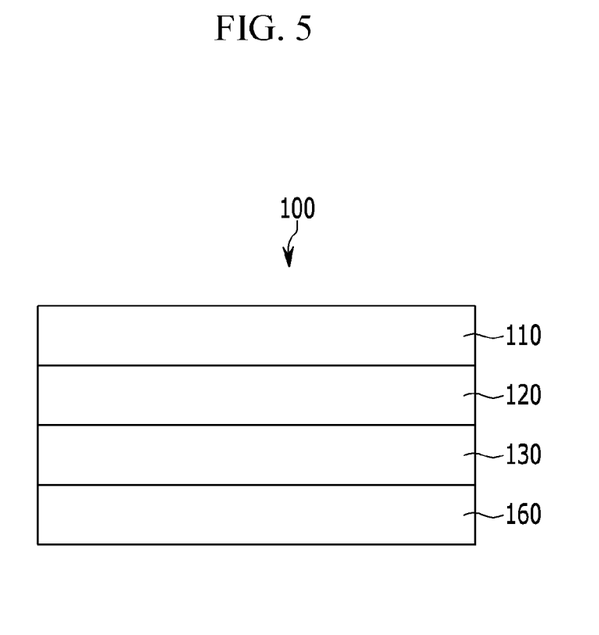

FIGS. 3 to 5 are schematic cross-sectional views of optical films according to other embodiments, In an embodiment, the optical film 100 may further include a protective layer 140 positioned on the other side of the polarization layer 110. In the embodiment, the protective layer 140 may provide a function of improving the durability of the optical film and reducing reflection or glare, and may include, for example, a triacetyl cellulose ("TAC") film, but is not limited thereto.

In an embodiment, the optical film 100 may further include a light blocking layer 150 along the edge thereof. The light blocking layer 150 may be provided in a strip along a perimeter of the optical film 100 in a plan view, and may be positioned, for example, between the first phase delay layer 120 and the second phase delay layer 130. In an embodiment, the light blocking layer 150 may include an opaque material, for example, a black material. In the embodiment, the light blocking layer may include a black ink, for example.

In an embodiment, the optical film 100 may further include a compensation layer 160 positioned on one side of second phase delay layer 130. In an embodiment, the compensation layer 160 may be a color shift resistant layer, but is not limited thereto.

Hereinafter, a method of manufacturing an optical film according to one embodiment is described.

Figure 6:
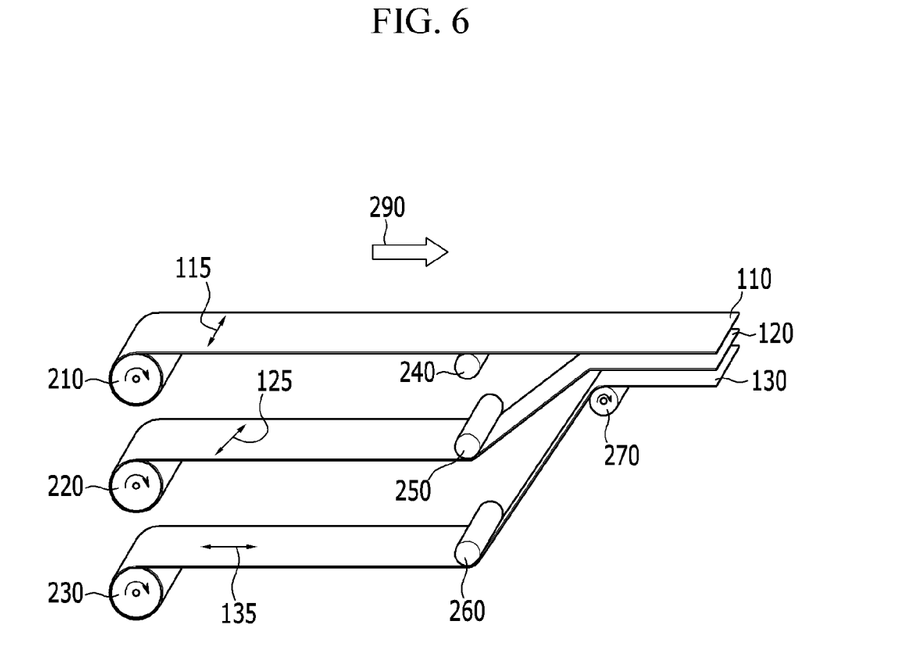
FIG. 6 is a view showing a method of manufacturing an optical film according to an embodiment.

FIG. 6 is a view showing a method of manufacturing an optical film according to one embodiment.

In an embodiment, the optical film may be manufactured by preparing each of a polarization layer 110, a first phase delay layer 120, and a stretched second phase delay layer 130 as a roll, and rolling the rolls in one direction to stack the same in a roll-to-roll process.

First, a polarization layer 110, a first phase delay layer 120, and a stretched second phase delay layer 130 are prepared.

In an embodiment, the polarization layer 110 may include, for example, stretched polyvinyl alcohol ("PVA"), and may be provided by a method of, for example, drawing the polyvinyl alcohol film, adsorbing iodine or a dichroic dye thereto, and borating and washing the same.

In an embodiment, the first phase delay layer 120 may be obtained by applying a solution including a liquid crystal onto a transparent substrate. In this case, the transparent substrate may be, for example, triacetyl cellulose ("TAO"), but is not limited thereto. In an embodiment, the solution may include a liquid crystal and a solvent such as toluene, xylene, and cyclohexanone, and the solution may be applied onto the transparent substrate by, for example, a solution process such as spin coating. Subsequently, it may further include drying the solution and curing the same using, for example, ultraviolet ("UV") light.

As described above, the transparent substrate may include a valley elongated along the same direction as the direction of the optical axis 125 of the first phase delay layer 120, and the liquid crystal may be arranged in a raw along with the valley to be aligned in a desirable angle. Accordingly, the liquid crystal may be aligned at an angle of, for example, about 17 degrees to about 27 degrees or about −27 degrees to about −17 degrees relative to the transmissive axis 115 of the polarization layer 110, or at an angle of, for example, about 22.5 degrees.

In another embodiment, the first phase delay layer 120 may be provided by providing an alignment layer on a transparent substrate, and coating a solution including a liquid crystal on the alignment layer. The alignment layer may stably and closely attach the liquid crystal thereto, and simultaneously improve the aligning property of the liquid crystal.

The second phase delay layer 130 may be provided by drawing a transparent polymer film in one direction. In an embodiment, the second phase delay layer 130 may be tilted and drawn at an angle of about 85 degrees to about 95 degrees, for example, about 90 degrees, relative to the transmissive axis 115 of the polarization layer 110.

Subsequently, referring to FIG. 6, a plurality of rolls 210, 220, and 230 respectively wound with the polarization layer 110, the first phase delay layer 120, and the second phase delay layer 130 are prepared, and the polarization layer 110, the first phase delay layer 120, and the second phase delay layer 130 wound on each roll 210, 220, and 230 are unwound in one direction 290 and moved in the direction 290. The drawn direction of the polarization layer 110 is substantially the same as the moving direction 290, and the transmissive axis 115 of the polarization layer 110 is substantially perpendicular to the drawn direction. The direction in which the liquid crystal of the first phase delay layer 120 is aligned and the optical axis may define an angle ranging from about 63 degrees to about 73 degrees or ranging from about −73 degrees to about −63 degrees relative to the moving direction 290, and the drawn direction and the optical axis of the second phase delay layer 130 may define an angle ranging from about −5 degrees to about 5 degrees relative to the propagating direction 290.

The moving layers 110, 120, and 130 are gathered into one region by a stack roll 270 and stacked (or assembled) and attached together. In FIG. 3, assistant rolls 240, 250, and 260 maintain each layer 110, 120, and 130 to be flat, respectively.

Further, another embodiment provides a display device including the optical film.

In the embodiment, the display device may be, for example, a liquid crystal display ("LCD") or an organic light emitting diode ("OLED") display, but is not limited thereto.

Hereinafter, the present invention is illustrated in more detail with reference to examples. However, these examples are exemplary, and the present invention is not limited thereto.

Preparation of Optical Film

EXAMPLE 1

(1) Preparation of Polarization Layer

A polyvinyl alcohol ("PVA") film (PS 60, Kuraray) is stretched until it has a thickness of around 22 micrometers (μm), and a hard coating film ("DNP") having a thickness of 40 μm is attached to one side of the stretched PVA film. The hard coating film has a shape in which hollow silica particles are coated on a TAC film.

(2) Preparation of First Phase Delay Layer

An alignment layer (polyacryl) is disposed on a triacetyl cellulose ("TAC") film (Fuji Film) and rubbed in a 22.5 degree direction relative to the transmissive axis of the polarization layer. Subsequently, a liquid crystal solution including liquid crystal (RMM 1049, Merck) and toluene is coated on the rubbed alignment layer to a thickness of 3 μm. Subsequently, the coated liquid crystal solution is dried and irradiated with UV light to provide a first phase delay layer in which a liquid crystal layer is disposed on the TAC film.

The first phase delay layer is a half-wave plate having optical properties shown in the following Table 1. The optical properties are measured using retardation measuring equipment (Kobra WPR).

TABLE 1

| | Retardation at 550 nm | | | Wavelength dispersion | |
|---|---|---|---|---|---|
| | $R_e 550$ | $R_{th}$ | $N_Z$ | $R_e 450/R_e 550$ | $R_e 650/R_e 550$ |
| First phase delay layer | 260.56 | 148.6 | 1.04 | 1.0601 | 0.985 |

* $N_z = (R_{th}/R_e) + 0.5$ (3) Preparation of Second Phase Delay Layer

A PMMA film (Okura, Japan) is stretched until 90 degrees relative to the transmissive axis to provide a second phase delay layer.

(4) Roll-to-roll Process

The polarization layer attached with the hard coating layer, the first phase delay layer, and the second phase delay layer are assembled according to the roll-to-roll process to provide an optical film.

COMPARATIVE EXAMPLE 1

An optical film is fabricated according to the same procedure as in Example 1, except that the first phase delay layer is omitted.

Evaluation

The optical films according to Example 1 and Comparative Example 1 are evaluated regarding reflectance and color shift.

The reflectance and the color shift are evaluated using a spectrophotometer (CM-3600d, Konica Minolta) while supplying light under the conditions of a light source of D65, reflection of 8 degrees, and a light receptor of 2 degrees.

The reflectance may be evaluated with Sample 1 in which the optical film according to Example 1 is attached to one side of a reflector (mirror) using an adhesive layer and Sample 2 in which the optical film according to Comparative Example 1 is attached to one side of a reflector (mirror) using an adhesive layer. As a control group, when the reflectances of a black plate and a white plate are denoted as 0 and 100, respectively, the reflectances of Samples 1 and 2 are calculated.

The color shift is evaluated by using a horizontal axis of a* and a vertical axis of b* in a CIE-Lab color coordinate system, where a positive a* is referenced by red, a negative a* is referenced by green, a positive b* is referenced by yellow, and a negative b* is referenced by blue, and the higher absolute value of a* and b*, the darker the color. The color shift is better as a*, b*, and Δa*b* become smaller.

The results are shown in Table 2 and FIG. 4.

Figure 7:
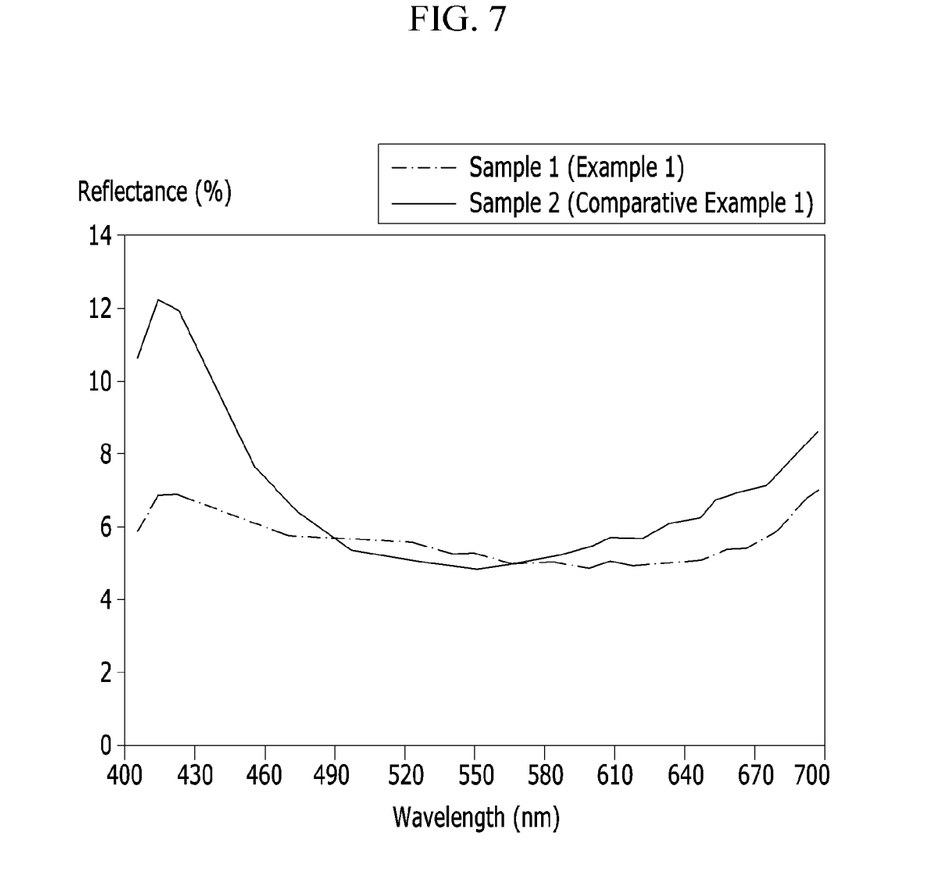
FIG. 7 is a graph showing reflectance depending upon wavelength of Sample 1 including an optical film according to Example 1 and Sample 2 including an optical film according to Comparative Example 1.

FIG. 7 is a graph showing the reflectance depending upon the wavelength of Sample 1 using the optical film according to Example 1 and Sample 2 using the optical film according to Comparative Example 1.

TABLE 2

| | Reflectance (%) | a* | b* | Δa*b* |
|---|---|---|---|---|
| Sample 1 (Example 1) | 5.26 | 0.55 | −3.87 | 3.91 |
| Sample 2 (Comparative Example 1) | 5.33 | 7.42 | −11.71 | 13.86 |

*$\Delta a * b * \sqrt{a*^2 + b*^2}$

Referring to Table 2, it is confirmed that Sample 1 using the optical film according to Example 1 significantly improves the reflectance and the color shift compared to Sample 2 using the optical film according to Comparative Example 1.

Referring to FIG. 7, it is confirmed that Sample 1 using the optical film according to Example 1 shows uniform reflectance through the entire visible ray region of about 400 nm to about 700 nm, and Sample 2 using the optical film according to Comparative Example 1 shows sharply increased reflectance in a short wavelength region of about 400 nm to about 500 nm and a long wavelength region of about 600 nm to about 700 nm in the visible ray region. Accordingly, it is confirmed that Sample 1 using the optical film according to Example 1 significantly decreases the wavelength dependency.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. An optical film comprising:
   a polarization layer;
   a first phase delay layer positioned on a side of the polarization layer and comprising a liquid crystal, wherein the liquid crystal has positive birefringence; and
   a second phase delay layer positioned on a side of the first phase delay layer and comprising poly(meth)acrylate, polystyrene, or a combination thereof, the second phase delay layer having thickness direction retardation of about −130 nm to about −50 nm for the incident light of the wavelength of about 550 nanometers,
   wherein
   the first phase delay layer has an optical axis defining an angle of about 17 degrees to about 27 degrees or about −27 degrees to about −17 degrees relative to a transmissive axis of the polarization layer, the second phase delay layer has an optical axis defining an angle of about 85 degrees to about 95 degrees relative to the transmissive axis of the polarization layer, the first phase delay layer has a short wavelength dispersion of about 1.00 to about 1.08, the first phase delay layer has a long wavelength dispersion of about 0.95 to about 1.00, the second phase delay layer has a short wavelength dispersion of about 1.00 to about 1.20, and the second phase delay layer has a long wavelength dispersion of about 0.85 to about 1.00.

2. The optical film of claim 1, wherein the liquid crystal is arranged along the optical axis of the first phase delay layer.

3. The optical film of claim 1, wherein the first phase delay layer further comprises:
a transparent substrate; and
a liquid crystal layer positioned on one side of the transparent substrate.

4. The optical film of claim 1, wherein the first phase delay layer has in-plane retardation of about 240 nanometers to about 300 nanometers for incident light of a wavelength of about 550 nanometers.

5. The optical film of claim 1, wherein the first phase delay layer has thickness direction retardation of greater than or equal to 0 for incident light of a wavelength of about 550 nanometers.

6. The optical film of claim 5, wherein the first phase delay layer has thickness direction retardation of 0 to about 300 nanometers for the incident light of the wavelength of about 550 nanometers.

7. The optical film of claim 1, wherein
the first phase delay layer has the optical axis defining an angle of about 22.5 degrees relative to the transmissive axis of the polarization layer, and
the second phase delay layer has the optical axis defining an angle of about 90 degrees relative to the transmissive axis of the polarization layer.

8. The optical film of claim 1, wherein the second phase delay layer comprises polymethylmethacrylate.

9. The optical film of claim 1, further comprising an adhesive layer positioned between the first phase delay layer and the second phase delay layer.

10. The optical film of claim 1, further comprising a protective layer positioned on the other side of the polarization layer facing the side of the polarization layer.

11. The optical film of claim 1, further comprising a light blocking layer positioned along an edge of the optical film in a plan view.

12. The optical film of claim 1, further comprising a compensation layer positioned on one side of the second phase delay layer.

13. A display device comprising the optical film of claim 1.

* * * * *